United States Patent Office 3,755,558
Patented Aug. 28, 1973

3,755,558
POLYLACTIDE-DRUG MIXTURES FOR
TOPICAL APPLICATION
Richard M. Scribner, Crestfield, Del., assignor to E. I. du
Pont de Nemours and Company, Wilmington, Del.
No Drawing. Filed Feb. 23, 1971, Ser. No. 118,081
Int. Cl. A61k 7/00
U.S. Cl. 424—47                                      10 Claims

ABSTRACT OF THE DISCLOSURE

Formulations of polyactide and drug for topical application to the body as films provide a slow sustained release of the drug to the site. The polylactide is biodegradable to normal or essentially normal metabolic products.

BACKGROUND OF THE INVENTION

Field of the invention

This invention relates to novel polymer-drug formulations and to their use in bringing about desired biological effects when applied topically to living organisms, particularly human beings and warm-blooded animals such as domestic animals and pets.

Description of the prior art

U.S. Pat. 3,297,033 discloses polyhydroxyacetic acid made into absorbable surgical devices such as sutures and filaments having controlled strength characteristics. It does not have the concept of a topical polylactide-drug composition for releasing drug to a desired external site at a controlled rate where the polymer is derived predominantly from lactide.

DESCRIPTION OF THE INVENTION

The invention is a non-irritating pharmaceutical composition for topical administration designed to release effective amounts of a drug over a predetermined period of time comprising at least one drug in intimate association with a polylactide polymer, the proportions of drug and polylactide ranging from 0.01% by weight of drug and 99.99% by weight of polylactide to 90% by weight of drug and 10% by weight of polylactide. The compositions can contain a suitable solvent, diluent or dispersing agent and optionally a propellent. When applied to living tissue by means of spraying and following removal of volatile diluent or solvent by evaporation, the resulting intimate mixture of polyactide and drug forms an adherent, pharmaceutically useful, medicated film. In such a film the polylactide may be considered as a carrier of matrix for the drug, and is designed to release effective amounts of the drug over a predetermined period of time.

The medicated films have the valuable characteristic of unrergoing gradual hydrolysis to release the drug and form physiologically normal substances. They do not, for example, have to be removed from burns, blisters, or open wounds but rather are absorbed slowly. If desired, such films can also be removed by washing with warm water, or they can simply be allowed to sluff off as their polymer components are decomposed by the hydrolytic action of tissue fluids and moisture. Like conventional medicated dressings, these polylactide-drug medicated films also serve to seal and protect lesions as well as to hold a drug in intimate contact with the area to be treated. However, they are more convenient, more comfortable, and cosmetically more acceptable than conventional dressings. Compositions of the invention that contain a propellent and are applied by spraying constitute a preferred embodiment. Further preferred are sprayable compositions containing an antibiotic agent, an anti-inflammatory agent, or mixtures of both.

The drug

The term "drug" is intended in its broadest sense as defined in the Federal Food, Drug and Cosmetic Act, Section 201(2)g:

(1) articles recognized in the official United States Pharmacopoeia, official Homeopathic Pharmacopoeia of the United States, or official National Formulary, or any supplement of any of them; and
(2) articles intended for use in the diagnosis, cure, mitigation, treatment, or prevention of disease in man or other animals;
(3) articles (other than food) intended to affect the structure or any function of the body of man or other animals; and
(4) articles intended for use as a component of any article specified in clause 1, 2 or 3; but does not include devices or their components, parts, or accessories.

Classes of drugs that may be specifically mentioned include antibacterials, such as benzalkonium chloride and benzyl benzoate; antibiotics, such as bacitracin and neomycin; antifungals, such as tolnftate, selenium sulfide and zinc undecylenate; antihistamines, such as diphenhydramine hydrochloride; antiinflammatories, such as hydrocortisone; antiparasitics, such as chlorphenanthane; antiperspirants, such as aluminum chloride hexahydrate; antipruritics, such as methanol and camphor; contraceptives; deodorants; drugs which promote healing, such as balsams and steroid anabolic agents; enzymes, such as fibrinolysin and desoxyribonuclease; hormones, such as estradiol 17β-enanthate; local anesthetics, such as xylocaine and benzocaine; rubifacients, such as methyl salicylate.

Examples of commercial fluorocorticoid anti-inflammatories which can be used in the practice of the invention are the following:

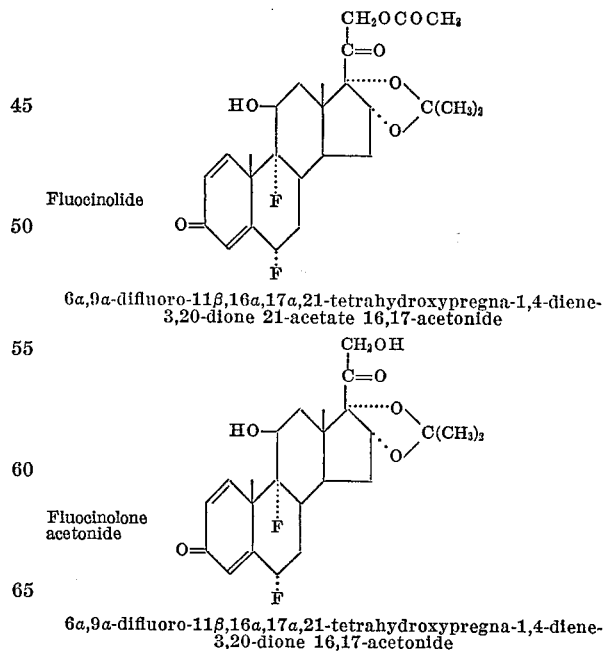

Fluocinolide

6α,9α-difluoro-11β,16α,17α,21-tetrahydroxypregna-1,4-diene-
3,20-dione 21-acetate 16,17-acetonide Fluocinolone
acetonide 6α,9α-difluoro-11β,16α,17α,21-tetrahydroxypregna-1,4-diene-
3,20-dione 16,17-acetonide

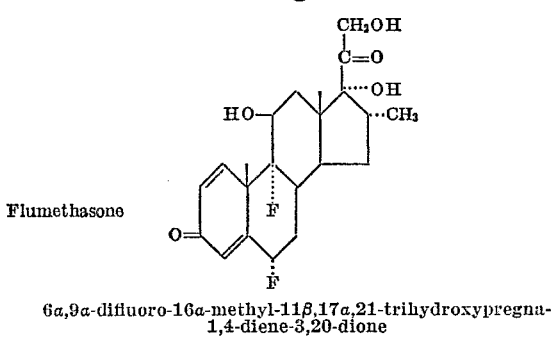

Flumethasone

6α,9α-difluoro-16α-methyl-11β,17α,21-trihydroxypregna-1,4-diene-3,20-dione

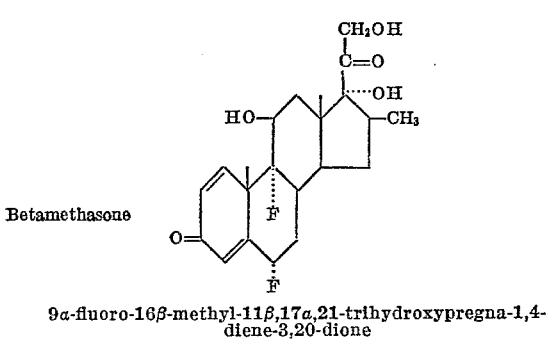

Betamethasone

9α-fluoro-16β-methyl-11β,17α,21-trihydroxypregna-1,4-diene-3,20-dione

The polylactide

The term "lactide" is intended to be used in both its generic sense to cover an intermolecular cyclic ester formed by the condensation of two molecules of an α-hydroxy acid, and also in its specific sense to cover the intermolecular cyclic ester formed by the condensation of two molecules of lactic acid (α-hydroxypropionic acid). The meaning in any given situation will be evident to one skilled in the art.

The polymers useful in practicing the invention consist essentially of repeating units of the formula $$-(R)_m-\underset{R'''}{\underset{|}{\overset{R'}{\overset{|}{C}}}}-\overset{O}{\overset{\|}{C}}-O-$$

wherein

R is lower alkylene of up to 6 carbon atoms, and preferably is methylene (—CH₂—), ethylene (—CH—CH₂—) or ethylidene (—CH(CH₃)—);

m is 0 or 1;

R' is H or lower alkyl of up to 6 carbon atoms, and preferably is H, methyl or ethyl;

R" is H or alkyl of up to 22 carbon atoms when m is 0, H or alkyl of up to 6 carbon atoms when m is 1;

R' and R" are the same or different; and at least 40% by weight of the polymer consists of the repeating unit (a) 

derived from lactic acid, or (b) 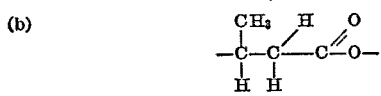

derived from β-hydroxybutyric acid.

Preferred, because of availability of starting materials, are lactide comonomer repeating units derived from α-hydroxycarboxylic acids, i.e. units of the above formula in which m is 0. It will be seen that when m is 0, R' is methyl and R" is H, the formula describes a repeating unit derived from lactic acid.

Further preferred because of their greater solubility in a range of solvents are polymers in which at least 70% by weight of the polymer consists of the aforesaid repeating unit derived from lactic acid or β-hydroxybutyric acid.

When R' and R" are different, the hydroxy acid from which the repeating unit is derived, and therefore the unit itself, can exist in optically active (D- and L-) forms or in optically inactive (DL-, racemic) form. For example, repeating units derived from lactic acid, considered either as the principal polymer component or as the comonomer component, can be present as D-lactide units, or DL-lactide units. For example, a polymer containing both L-lactide and DL-lactide repeating units is defined in the present invention as a copolymer, e.g., an L-lactide/DL-lactide copolymer.

Illustrative of the comonomers which can be employed with lactide to form copolymers useful in preparing the formulations of this invention are β-propiolactone, glycolide, tetramethylglycolide, β-butyrolactone (derived from β-hydroxybutyric acid), γ-butyrolactone, pivalolactone, and intermolecular cyclic esters of α-hydroxybutyric acid, α-hydroxyisobutyric acid, α-hydroxyvaleric acid, α-hydroxyisovaleric acid, α-hydroxycaproic acid, α-hydroxy-α-ethylbutyric acid, α-hydroxyisocaproic acid, α-hydroxy-β-methylvaleric acid, α-hydroxyheptanoic acid, α-hydroxyoctanoic acid, α-hydroxydecanoic acid, α-hydroxymyristic acid, α-hydroxystearic acid, α-hydroxylignoceric acid and the like.

In addition to being usable as a comonomer, β-butyrolactone can be used as the sole monomer or as the principal monomer along with any of the comonomers recited above, i.e., poly-β-butyrolactone and copolymers thereof can be used as polymers in the formulations of the invention. The term polylactide as used herein is intended to include poly-β-butyrolactone and copolymers of β-butyrolactone with the comonomers recited in the immediately preceding paragraph. The preferred sole monomer or principal monomer is lactide.

Where lactic acid is used to prepare the polymer, it is clear that the polymer's hydrolysis products will include lactic acid which is a normal metabolite of the body. Where the polymer is prepared from the other compounds listed above, the hydrolysis products will be related in structure to those derived from lactic acid polymers and will have no deleterious or untoward effect on the body.

In preparing the polymers and copolymers from which the formulations of this invention are made, the appropriate intermolecular cyclic esters (generically, lactides) or intramolecular cyclic esters (lactones) of the hydroxy acids are used. Intermolecular cyclic esters containing six-membered rings, e.g., glycolide, are usually used to introduce repeating units derived from alpha-hydroxy acids. Monomeric lactones, e.g., β-propiolactone and γ-butyrolactone, are usually used to introduce repeating units derived from β- or γ-hydroxy acids.

The polymerization is effected by heating the lactide above its melting point in the presence of a polyvalent metal oxide or compound thereof, under anhydrous conditions in an inert atmosphere.

Specially useful catalysts are zinc oxide, zinc carbonate, basic zinc carbonate, diethylzinc, tributylaluminum, titanium, magnesium or barium compounds, litharge, and the like.

The amount and type of catalyst used determine the particular temperature and time required to produce polymer useful for conversion to the formulations of this invention. Thus the amount of catalyst can be as low as 0.01 weight percent or as high as 2 weight percent of the total weight of reactants. As a rule, the lower the amount of catalyst, the longer the time required to produce polymer of a given inherent viscosity and, conversely, the higher the catalyst concentration, the shorter the time.

The best balance is usually obtained employing from 0.02 weight percent to 1 weight percent of catalyst.

In general, it is desirable to agitate the reaction mixture continuously during the polymerization in order to produce a homogeneous polymer at good conversions and to conduct the reaction in two steps, the first being carried out at a lower temperature than the second, or finishing step. Other methods, such as those disclosed in U.S. Pats. 2,703,316 and 2,758,987, can be used in making the polymers. The degree of polymerization can be varied over a considerable range. In general, the higher the degree of polymerization, that is, the higher the molecular weight of the polylactide, the slower is its rate of absorption, etc. in the body and the slower will be the rate of release of its associated drugs. Polymers that are polymerized to the extent of being solids are generally preferred.

The following is an example of a method for preparing a polymer or copolymer useful in the formulations of this invention: Lactide, which is the intermolecular ester derived from 2 moles of lactic acid, is purified by several crystallizations from carbon tetrachloride and placed either alone in the case of homopolymerization, or with one or more comonomers in case of copolymerization, in a thoroughly dried reactor equipped with a stirrer and nitrogen inlet tube. Dry nitrogen is introduced immediately above the reaction mixture and heating and stirring are started. When the temperature of the reaction mixture has reached about 100° C., the nitrogen inlet is replaced by a thermometer, and from about 0.01 to 2 weight percent of an oxide or salt of a Group II metal of atomic number 12 through 56, or litharge is added. In the case of polymerization with a liquid comonomer the liquid comonomer is preferably added after the lactide has melted. Heating is continued until polymer having the desired inherent viscosity, e.g., 0.5 to 0.1% concentration in benzene at 25° C. is obtained. This may require from a few minutes up to 25 or more hours, depending upon the catalyst used. The foregoing is not intended to be limiting since the viscosity may range from about 0.3 or less to about 4.0 or more, for example in benzene, chloroform or other suitable solvent.

Polymer, produced as above, may be suitably further treated by cutting it into small pieces, dissolving in a suitable solvent, for example, benzene, toluene or xylene, and precipitating the polymer by pouring the solution into a large volume of a nonsolvent for the polymer, desirably hexane or methanol. The precipitated polymer is removed by filtration, transferred to a blender and a nonsolvent for the polymer is added. The blender is started and after a homogeneous dispersion has been obtained, the dispersion is filtered. The polymer is allowed to dry on the filter, and is then transferred to a vacuum oven. After drying overnight at 100° C., the polymer is removed from the oven and allowed to cool at ambient temperature.

The solvent or diluent

Commercial available organic solvents or mixtures thereof can be used to prepare the formulations of the invention. Those skilled in the art of polymer handling and of drug formulation can readily determine, with minimum experimentation, a suitable solvent system for use with any given polyactide-drug combination of the invention.

The solubility of the polylactide depends to some extent on its structure. Poly-L-lactide is soluble in chloroform. Poly-DL-lactide is soluble in this solvent and also in dioxane, butyl acetate, tetrahydrofuran, methyl ethyl ketone, cyclohexanone, benzyl alcohol, dimethyl carbonate, and ethyl chloride. Copolymers in general are soluble in a wider variety of solvents than are homopolymers. For example, lactide/glycolide copolymers containing a predominant amount of lactide constituent are soluble in most or all of the solvents mentioned above and also in acetone and ethyl acetate.

In addition, as is well known to one skilled in the art, the solubility of a polylactide will depend on its molecular weight. In general, polylactides of relatively lower weights will be more soluble in particular solvents and will be soluble in a greater variety of solvents.

The propellent

Inert propellents for use in spray formulations are well known in the art. One versed in the field of aerosol technology wil be readily able to select a propellent suitable for use with a given polymer-drug-diluent mixture, as set out for example in the text "Principles of Aerosol Technology," Paul A. Sanders, 1970 (Van Nostrand Reinhold). The preferred propellents are low-boiling fluorohaloalkanes containing one or two carbon atoms, particularly those slod under the name Freon®. Mixtures of more than one propellent can be used.

Suitable propellents include the following:

| Formula: | Approx. B.P., ° C. |
|---|---|
| $CHF_2Cl$ | −41 |
| $CF_2ClCF_3$ | −39 |
| $CF_2Cl_2$ | −30 |
| $CH_3Cl$ | −24 |
| $CH_3CF_2Cl$ | −10 |
| $CF_2ClCF_2Cl$ | 4 |
| $CHFCl_2$ | 9 |
| $C_2H_5Cl$ | 12 |
| $CHFClCHF_2$ | 17 |

In addition, certain higher-boiling fluorohaloalkanes, not normally regarded as propellents by themselves, can be mixed with any of the propellents discussed above to lower the overall pressure of the mixture. An example is $CFCl_3$, B.P. 24° C.

In some cases a single compound can function both as a solvent and as a propellent. An example is ethyl chloride.

PREPARATION AND ADMINISTRATION OF THE FORMULATIONS

The drug, the polymer, the solvent or diluent, optionally the propellent, and optionally one or more other additives discussed below can be mixed by any of a number of conventional methods.

Coating, embedding or intimately mixing the drug compound with the polymer for use in producing the sprayable composition can be accomplished in the following ways:

(A) Coating the discrete drug particles or drug-particle aggregates, agglomerates or flocs by:

(1) Spray drying: Finely divided drug particles are suspended in a solvent system in which the drug is not soluble containing the dissolved polymer and other agents, e.g., extenders, plasticizers, dyes, etc., in the drug/polymer ratio from 1/99 to 99/1, followed by spray drying. For example: Drug particles 0.2 to 10 microns in size and equal to the weight of polymer used are suspended in a chloroform solution of polymer in such a concentration as to give a liquid viscosity suitable for atomizing. The drug-polymer mixture is spray-dried using conventional methods of atomizing, e.g., centrifugal wheel, pressure and two-fluid nozzle using appropriate drying conditions and temperatures that do not exceed the softening point of the polymer and do not exceed the melting point or composition point of the drug.

(2) Pan coating or fluid-bed coating: Place granules or pellets, 5 microns to 20 mm., preferably between 0.25 and 10 mm. diameter, in a rotating coating pan or fluid-bed drier, and apply polymer (dissolved in a carrier to a suitable viscosity for spraying) by spraying until a suitable coating quantity has been deposited to give the required release-rate characteristics. For example: Granules of drug are prepared by extrusion of a wet granulation or other suitable methods known to the art, and dried. 16-to-40-mesh granules are placed in a rotating coating pan and a solution of polymer, dissolved in a suitable nonaqueous volatile solvent, is sprayed onto the moving granules with a continuous fine spray under conditions known to the art, until a coating giving the desired release rate has been applied. The granules are then dried.

(3) Micro-encapsulation: Suspend drug particles, granules or pellets (.1 to 2000 microns diameter) in a solvent system in which the drug is not soluble, and which contains in solution the polylactide or polylactide mixture. Add an agent incompatible with the polymer-solvent system, such as an incompatible polymer, a nonsolvent for the polymer, or a salt, or vary conditions such as temperature and pressure. One or a combination of the above will precipitate the polymer, coating the drug particles, granules or pellets. For example, 0.5-to-25-micron drug particles are suspended in chloroform (in which they are not soluble) containing the polylactide polymer mixture in solution at such a concentration as to give a low-viscosity solution. A miscible solvent in which the polymer is not soluble, such as hexane, is then added slowly to precipitate the polymer. The coated particles are filtered and washed with hexane and allowed to dry.

(B) Embedding: The polymer or polymer mixture is melted and a nonheat-labile drug is suspended and thoroughly dispersed in the melt. The melt is congealed by spraying, or in a mass and ground into small particles to give a polymer matrix with the drug embedded. For example: the polylactide polymer mixture is melted and 0.5-to-400-micron (preferably 0.5-to-25-micron) drug particles are suspended and thoroughly dispersed in the molten polymer in a concentration necessary to give the desired release rate patterns. The polymer is congealed by cooling in a mass and ground into small pieces 1 to 200 microns in size.

(C) Intimate mixing: The drug and polymer are dissolved in a common solvent and the solvent is removed in some suitable way (spray-drying, flash-evaporation, etc.). For example: the drug and polylactide polymer are dissolved in chloroform in a 1:1 ratio and to a concentration of 2% in the solvent. The solvent is flash-evaporated and the resulting film is scraped from the flask and powdered.

For preparations to be sprayed onto living tissue, the drug, if in powder form coated with polymer, should be no greater than 10 microns in diameter. This powder may be formulated to be dispersed in a suspension or dispersion system or in a quick-breaking foam. The drug may also be suspended in a nonsolvent or propellent containing the dissolved polymer, so that the drug particles are coated while being dispensed by the spray. Intimate mixing and sustained release may also be obtained if both drug and polymer are dissolved in a common solvent or solvent mixture. Continuous sprays or metered-dose sprays may be used, depending on dosage requirements.

The formulations of the invention may contain pharmaceutically acceptable inert additives such as plasticizers and carriers. Examples are propylene glycol, Carbowax® polyethylene glycols, glycerides, and ethyl cellulose. Very low molecular weight polylactides, or even the monomeric acids (e.g. lactic acid) are particularly useful for softening a high-molecular-weight polylactide matrix, making it more adhesive and flexible without sacrificing biodegradability.

The relative proportions of the drug and the polymer can be varied over a wide range, depending on the desired effect. Proportions may range from 0.01% of drug and 99.99% of polymer to 90% of drug and 10% of polymer. Ratios that have shown good results include one part of drug to from 4–20 parts of polymer.

Polymer/solvent ratios will be determined to some extent by the inherent viscosity of the polylactide chosen. In general polylactide solutions containing from 1 to 20% by weight of polymer in solvent are suitable; higher concentrations tend to be too viscous for spraying. The amount of propellent employed will depend on its boiling point and solvent characteristics and can range all the way from 99% propellent with 1% polymer when the propellent is also the solvent, to 10% propellent, 90% solvent when the propellent is very low boiling and a poor solvent for the polymer or drug.

SPECIFIC EMBODIMENTS OF THE INVENTION

The following examples illustrate the products and processes of the invention. All parts are by weight unless stated otherwise.

Example 1

One gram of lactide/glycolide (70/30) copolymer, prepared according to the general procedure mentioned above, was dissolved in 48 ml. of chloroform. The polymer had an inherent viscosity of about 2.31 at 0.1% in chloroform at 30° C. Prednisolone (1,4-pregnadiene-3,20-dione-11$\beta$,17$\alpha$,21-triol) (5 mg.) was dissolved in 25 ml. of this solution. A portion of the polymer-drug solution was sprayed onto the skin of the forearm of an adult human male by means of an aerosol spray apparatus ("Spray-eze"®) containing $CF_2Cl_2$ as the propellent. This left an adherent film containing 1% by weight of steroid. It was adherent, flexible, comfortable, transparent, and it was more durable than a common ointment formulation, which is messy and subject to adventitious removal.

Example 2

The polymer-drug solution of Example 1 was mixed with a small amount of propylene glycol (5% by wt. of the polymer) and sprayed as in Example 1 onto the skin of the forearm of an adult human male giving a film which was judged to be more flexible than the film obtained in Example 1.

Example 3

One-half gram of each of three samples of poly-DL-lactide was dissolved in a solution of 5.0 mg. of prednisolone in 49.5 ml. of ethyl acetate. A portion of each of the resulting polymer-drug solutions was sprayed onto a glass surface by the method of Example 1. The properties of the starting polymers and of the films are summarized in the following table.

| Polymer | | |
|---|---|---|
| Inherent viscosity (0.1% in benzene) | Molecular weight (by gel permeation chromatography) | Properties of film |
| 1.50 | 240,000 | Tough, clear, slightly elastic. |
| 0.50 | 41,000 | Less tough, clear, slightly sticky. |
| 0.36 | 32,000 | Also less tough, clear, slightly tacky. |

The embodiments of the invention in which an exclusive property or privilege is claimed are defined as follows:

1. A sprayable pharmaceutical composition for topical administration, which, upon being sprayed, forms an adherent, pharmaceutically useful, medicated film at a desired external site that gradually releases an effective amount of a topically and externally useful drug from said adherent film applied to said desired external site over a predetermined period of time comprising 10–99% by weight of an aerosol spray propellent, which may be a solvent or non-solvent for the drug or the polymer, and which may contain a solvent for the drug or polymer, having respectively, dissolved therein, or suspended therein as finely divided particles not greater than 10 microns in diameter, an effective amount of a topically and externally useful drug and an adherent film forming polyactide polymer which polymer is non-reactive toward external body tissue and which undergoes biodegradation externally by gradual hydrolytic action of tissue fluids and moisture on the body into physiologically normal or essentially normal metabolic products, said polymer consisting essentially of repeating units of the formula

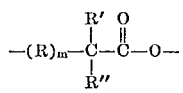

wherein R is alkylene of 1 to 6 carbon atoms;
m is 0 or 1;
R' is H or alkyl of 1 to 6 carbon atoms;
R'' is H or alkyl of 1 to 22 carbons when m is 0; or
 H or alkyl of 1 to 6 carbons when m is 1; and
at least 40% by weight of the polymer consists of the repeating unit

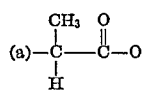

derived from lactic acid in which m=0, R'=CH₃ and R''=H, or

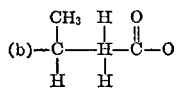

derived from β-hydroxybutyric acid in which m=1, R=CH(CH₃)—, and R''=H,
the proportions of drug and polymer ranging from 0.01% by weight of drug and 99.99% by weight of polymer to 90% by weight of drug and 10% by weight of polymer, said polylactide drug-medicated film capable of serving to seal and protect lesions without having to be removed from burns, blisters or open wounds.

2. The pharmaceutical composition of claim 1 wherein at least 70% by weight of the polymer consists of the said repeating unit derived from lactic acid or β-hydroxybutyric acid.

3. The pharmaceutical composition of claim 1 containing a halogenated hydrocarbon as propellent.

4. The pharmaceutical composition of claim 1 in which the drug is an antiinflammatory agent.

5. The pharmaceutical composition of claim 4 in which the antiinflammatory agent is 1,4-pregnadiene-3,20-dione-11β,17α,21-triol.

6. The pharmaceutical composition of claim 1 in which the drug is an antibiotic.

7. The pharmaceutical composition of claim 1 in which the polymer is derived from an α-hydroxy carboxylic acid.

8. The pharmaceutical composition of claim 7 in which the polymer is derived solely from lactic acid.

9. A sprayable composition of claim 1 containing a solvent for the polymer and for the drug.

10. A sprayable composition of claim 1 containing a diluent.

References Cited
UNITED STATES PATENTS

| | | | |
|---|---|---|---|
| 3,297,033 | 1/1967 | Schmitt et al. | 128—335.5 |
| 3,435,008 | 3/1969 | Schmitt et al. | 260—78.3 |
| 3,531,561 | 9/1970 | Trehu | 264—210 |
| 3,225,766 | 12/1965 | Baptist et al. | 128—335.5 |
| 2,625,158 | 1/1953 | Lee et al. | 128—260 |
| 3,636,956 | 1/1972 | Schneider | 128—335.5 |
| Re. 26,963 | 10/1970 | Hardy | 424—89 |

SHEP K. ROSE, Primary Examiner

U.S. Cl. X.R.

128—260, 335.5; 424—78, 243

UNITED STATES PATENT OFFICE
CERTIFICATE OF CORRECTION

Patent No. 3,755,558　　　　Dated August 28, 1973

Inventor(s) RICHARD M. SCRIBNER

It is certified that error appears in the above-identified patent and that said Letters Patent are hereby corrected as shown below:

Col. 3, line 50 - -CH-CH$_2$- should be -CH$_2$-CH$_2$-.

Col. 4, line 13 - "L-lactide units," should be inserted at the start of the line.

Col. 4, line 38 - a hyphen should be at the end of the line.

Col. 6, line 10 - correct the spelling of "will".

Col. 6, line 16 - correct the spelling of "sold".

Col. 9, between lines 20 and 25 - the subject matter should be (a)　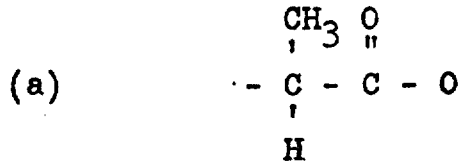

Col. 9, line 30 should be (b)　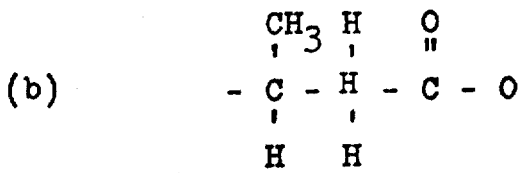

Signed and sealed this 4th day of June 1974.

(SEAL)
Attest:

EDWARD M. FLETCHER, JR.　　　　C. MARSHALL DANN
Attesting Officer　　　　　　　　Commissioner of Patents

UNITED STATES PATENT OFFICE
CERTIFICATE OF CORRECTION

Patent No. 3,755,558          Dated August 28, 1973

Inventor(s) Richard M. Scribner

It is certified that error appears in the above-identified patent and that said Letters Patent are hereby corrected as shown below:

Col. 9, line 30 should read

-- (b) 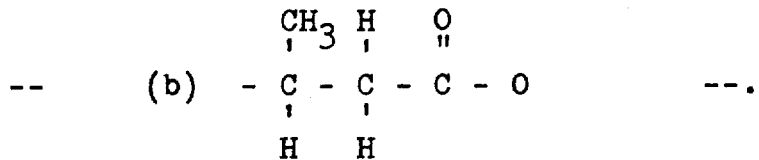 --.

Signed and sealed this 16th day of July 1974.

(SEAL)
Attest:

McCOY M. GIBSON, JR.
Attesting Officer

C. MARSHALL DANN
Commissioner of Patents